United States Patent

[11] 3,631,371

[72] Inventor Jean Maurice
Nice, France

[21] Appl. No. 51,292
[22] Filed June 30, 1970
[45] Patented Dec. 28, 1971
[73] Assignee Societe Francaise de l'Electro Resistance
[32] Priority July 29, 1969
[33] France
[31] 6925938

[54] ROTARY-CONTACT POTENTIOMETER
9 Claims, 11 Drawing Figs.

[52] U.S. Cl. .......... 338/164, 338/162
[51] Int. Cl. .......... H01c 9/02
[50] Field of Search .......... 338/162, 164, 174

[56] References Cited

UNITED STATES PATENTS

| | | | |
|---|---|---|---|
| 3,377,606 | 4/1968 | Ferrell | 338/164 X |
| 3,533,042 | 10/1970 | Casey et al. | 338/162 |
| 3,377,605 | 4/1968 | Baskett | 338/162 |
| 3,537,056 | 10/1970 | Van Benthuysen et al. | 338/164 X |
| 3,363,212 | 1/1968 | Joy | 338/174 |
| 3,197,727 | 7/1965 | Hulbert | 338/164 X |
| 3,201,737 | 8/1965 | Mathison | 338/174 |

*Primary Examiner*—Lewis H. Myers
*Assistant Examiner*—D. A. Tone
*Attorney*—Young & Thompson

ABSTRACT: A rotary-contact potentiometer especially of the miniature type and primarily intended for use in electronic circuitry comprising an insulating casing having an axial cavity and containing in addition to other components a slider and slider-actuating member which are both rotatably mounted on a shaft attached to the casing, means for driving said actuating member, a resistance track, an external metal jacket which surrounds the casing and serves to maintain all the components in position. The potentiometer comprises at least one stop which is associated with the control means aforesaid and serves to limit the angular displacement, said stop being constituted by a boss formed on the jacket. At the end of travel, the effort is therefore exerted on a metallic stop which is endowed with sufficient mechanical strength.

INVENTOR

JEAN MAURICE

BY Young & Thompson

ATTYS.

INVENTOR

JEAN MAURICE

BY Young & Thompson

ATTYS.

INVENTOR
JEAN MAURICE
BY Young + Thompson
ATTYS.

ROTARY-CONTACT POTENTIOMETER

This invention relates to an improved rotary-contact potentiometer, especially of the miniature type, which is intended to be employed in electronic circuitry and more especially in assemblies which entail the use of hybrid or integrated circuits.

It is known that potentiometers of the miniature type have very small dimensions and that their components which are of course extremely small are consequently delicate.

This is particularly the case with stops and counterstops which limit the travel of the slider and which are liable to be forced by the user during an operation, thereby causing unintentional damage. Incidents of this type often arise when the control device is formed by molding of thermosetting insulating material which has low mechanical strength.

The present invention is intended to overcome the disadvantages referred to above.

The rotary-contact potentiometer in accordance with the invention, especially of the miniature type and primarily intended for use in electronic circuitry, comprises an insulating casing having an axial cavity and containing in addition to other components a slider and slider-actuating member which are both rotatably mounted on a shaft attached to the casing, means for driving said actuating member, a resistance track, an external metal jacket which surrounds the casing and serves to maintain all the components in position. The potentiometer essentially comprises at least one stop which is associated with the control means aforesaid and serves to limit the angular displacement, said stop being constituted by a boss formed on the jacket.

At the end of travel, the effort is therefore exerted on a metallic stop which is endowed with sufficient mechanical strength.

In a preferred embodiment, the slider and slider-actuating member are separated from the exterior by means of a protective rotary plate to which a driving movement is intended to be applied from the exterior.

The elements contained within the casing are thus also protected.

As a preferable feature, the protective plate is rotatably mounted within the cavity of the casing between the jacket which surrounds said casing and a flexible annular seal which surrounds the slider-actuating member.

Leak-tightness of the casing is thus ensured in a simple and effective manner.

The slider-actuating member is advantageously provided with a diametrical slot associated with a protective lining in order to permit actuation of said member by means of a tool such as a screwdriver, said protective lining being preferably constituted by two flanges forming part of the protective plate and engaged in the diametrical slot. The slot of the actuating member is thus protected against any excessive efforts produced by means of the screwdriver.

The protective plate advantageously comprises at least one projecting stud which comes into abutment with a boss of the jacket in order to limit angularly the movement of rotation of the slider.

The efforts arising from the stop are thus applied solely to metallic portions.

In another simplified embodiment, the slider-actuating member is provided with a diametrical slot in the external face thereof in order to permit actuation of said member by means of a tool such as a screwdriver, said slot being dissymmetrical with respect to the axis of rotation of the actuating member. Moreover, the protective jacket is provided with at least one boss which projects towards the axis of rotation and constitutes a stop which limits angularly the rotation of the tool.

It thus follows that, at the end of travel, the effort produced by the stop is exerted only on the screwdriver while the slot is subjected only to the effort which is necessary to ensure rotation of the slider.

In the same embodiment, the slider-actuating member is provided with a slightly flexible and resilient annular skirt, the edge of said skirt being applied against the internal wall of the cavity of the casing.

Internal leak-tightness of the casing is thus ensured in a satisfactory manner.

Further properties of the invention will be brought out by the description which now follows below.

Two preferred embodiments of the invention are illustrated in the accompanying drawings which are given by way of example without any limitation being implied.

In the first embodiment,

Figure 4:
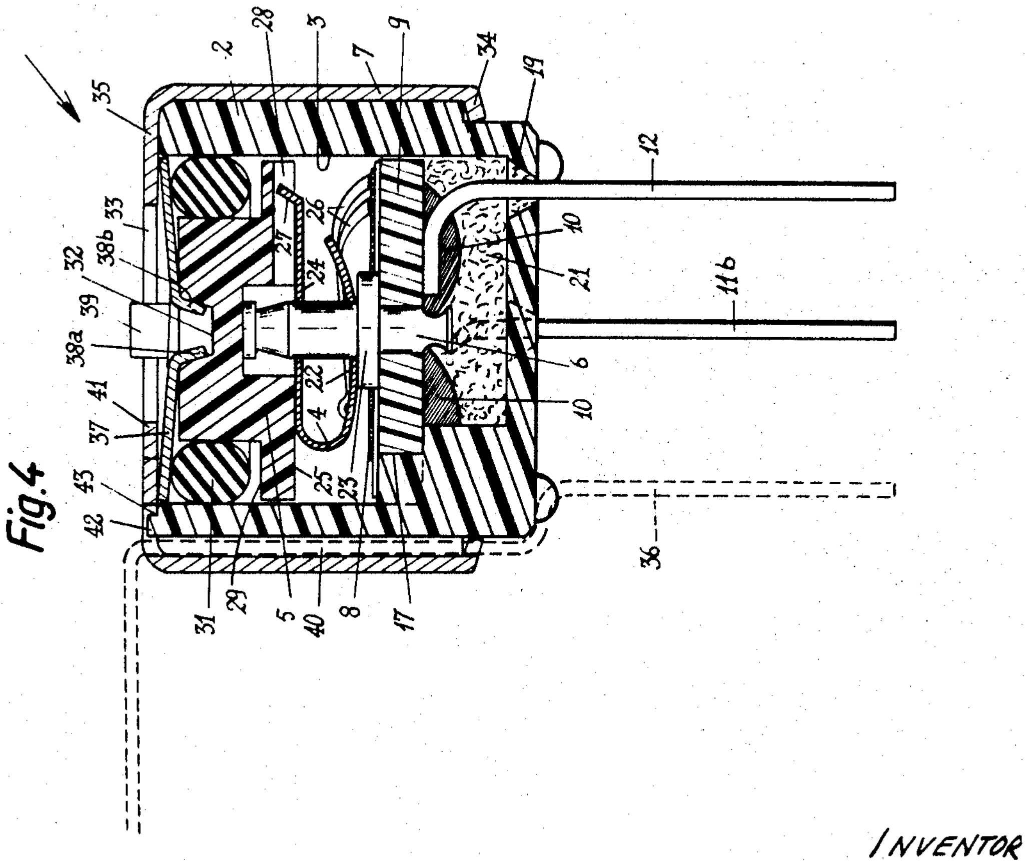
FIG. 4 is an enlarged sectional view taken along line IV—IV of FIG. 3.
Figure 11:
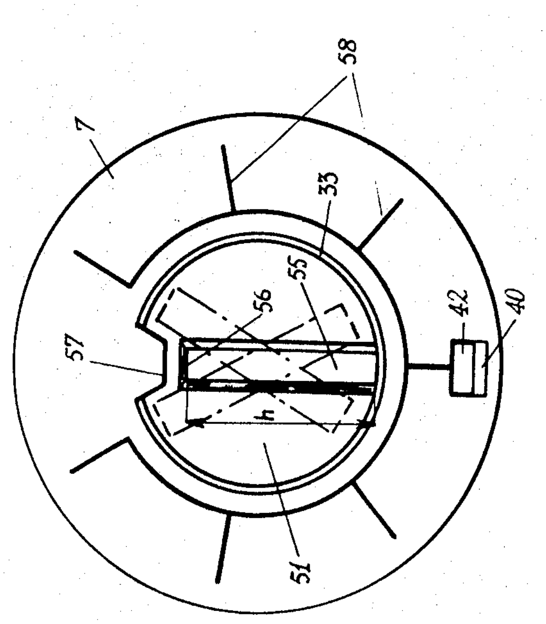
Figure 10:
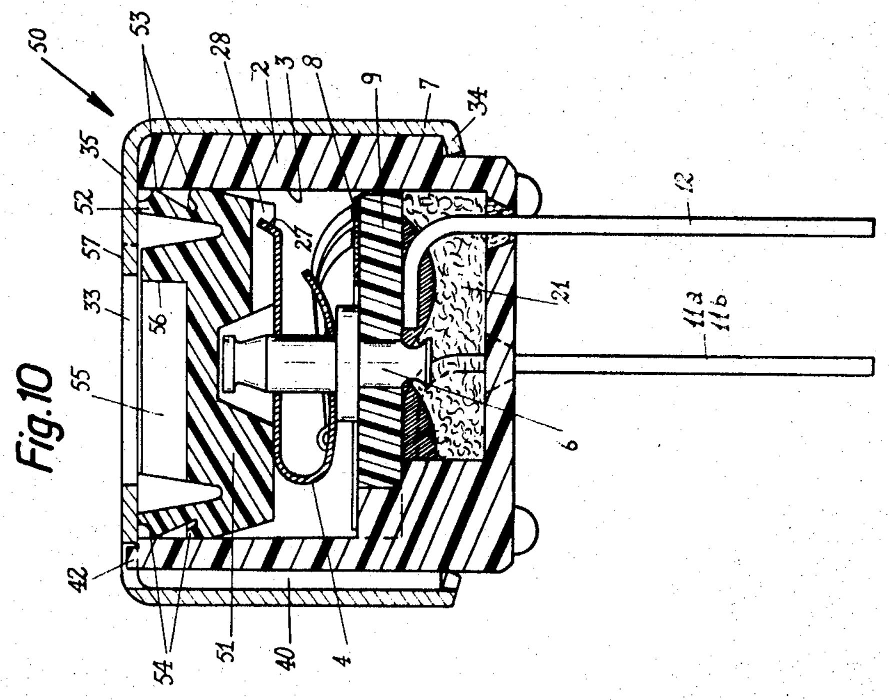

In a second embodiment,

FIG. 10 is a diametrical sectional view corresponding to FIG. 4 of the first embodiment;

FIG. 11 is a top view corresponding to FIG. 10.

In the first embodiment described with reference to FIGS. 1 to 9, the potentiometer 1 which has a cylindrical volume comprises an insulating casing 2 having a cylindrical contour and provided with an axial cavity 3 which contains a slider 4 and the slider-actuating member 5. The components 2 and 5 are advantageously formed of a thermosetting material such as diallyl phthalate which affords heat resistance and electric insulation.

The slider 4 and the actuating member 5 are rotatably mounted on a shaft 6 which is rigidly fixed to the casing 2. Said casing is fitted with a metal jacket 7.

The circular resistance track 8 (formed, for example, of ceramic-metal material known as "cermet") is deposited by means of serigraphic methods on a support 9 formed of insulating material such as alumina which is placed in the bottom of the casing 2. Connector-pins 11*a*, 11*b* and 12 having a rectangular cross section are attached by means of weld fillets 10 to that face of the support 9 which is opposite to the track 8.

The connector-pins 11*a*, 11*b* are connected respectively to both ends of the track 8 by means of conductive strips 13*a*, 14*a*, 15*a*, and 13*b*, 14*b*, 15*b*, the strips 14*a* and 14*b* being placed on the cylindrical edge of the support 9.

The connector-pin 12 is connected to the shaft 6 by means of a conductive strip 16. There is no limitation imposed on the choice of material to be employed for the resistor and its support on condition that the resistor has the desired electric properties and strength and that the support provides electric insulation and has good heat conductivity. Thus, the resistor could also be formed of a film of metal alloy and the support could be formed of beryllium oxide.

A lug 17 which forms part of the casing 2 and is engaged within a groove 18 of the support 9 secures this latter in a relative angular position within the casing 2.

The connector-pins 11*a*, 11*b* and 12 are passed out of the casing 2 through rectangular openings 19.

The support 9 and the connector-pins 11*a*, 11*b* and 12 are sealed in the base of the casing by means of insulating material 21.

The slider 4 is of the bowed hairpin type and formed of a resilient metal such as beryllium bronze and is elastically applied by means of its arm 22 against an annular bearing surface or boss 23 of the shaft 6 and by means of its arm 24 against the internal face 25 of the member 5 which serves to actuate the slider 4. Contact brushes 26 which are attached to the arm 22 are applied elastically against the track 8. The slider 4 is coupled for rotation with the actuating member 5 by means of a lug 27 formed on the arm 24 and engaged in a radial groove 28 of said actuating member 5.

The actuating member 5 which is rotatably mounted in the casing 5 on the shaft 6 is provided with a cylindrical shoulder 29. A flexible O-ring seal 31 is fitted within the toric cavity formed between the internal wall of the casing 2 and the actuating member 5.

A diametrical slot 32 is formed in the external face of said actuating member for the purpose of operating this latter by means of a tool such as a screwdriver.

The base 35 of the metal jacket 7 is applied against the rim of the casing 2 and is provided with a window 33. The jacket 7 is attached to the casing 2 by means of a crimped edge 34.

Provision is also made for a ground (earth) connector-pin 36 which is inserted between the casing 2 and a passageway 40 of the jacket 7.

Figures 1, 2, 3, 5, 8, 9:
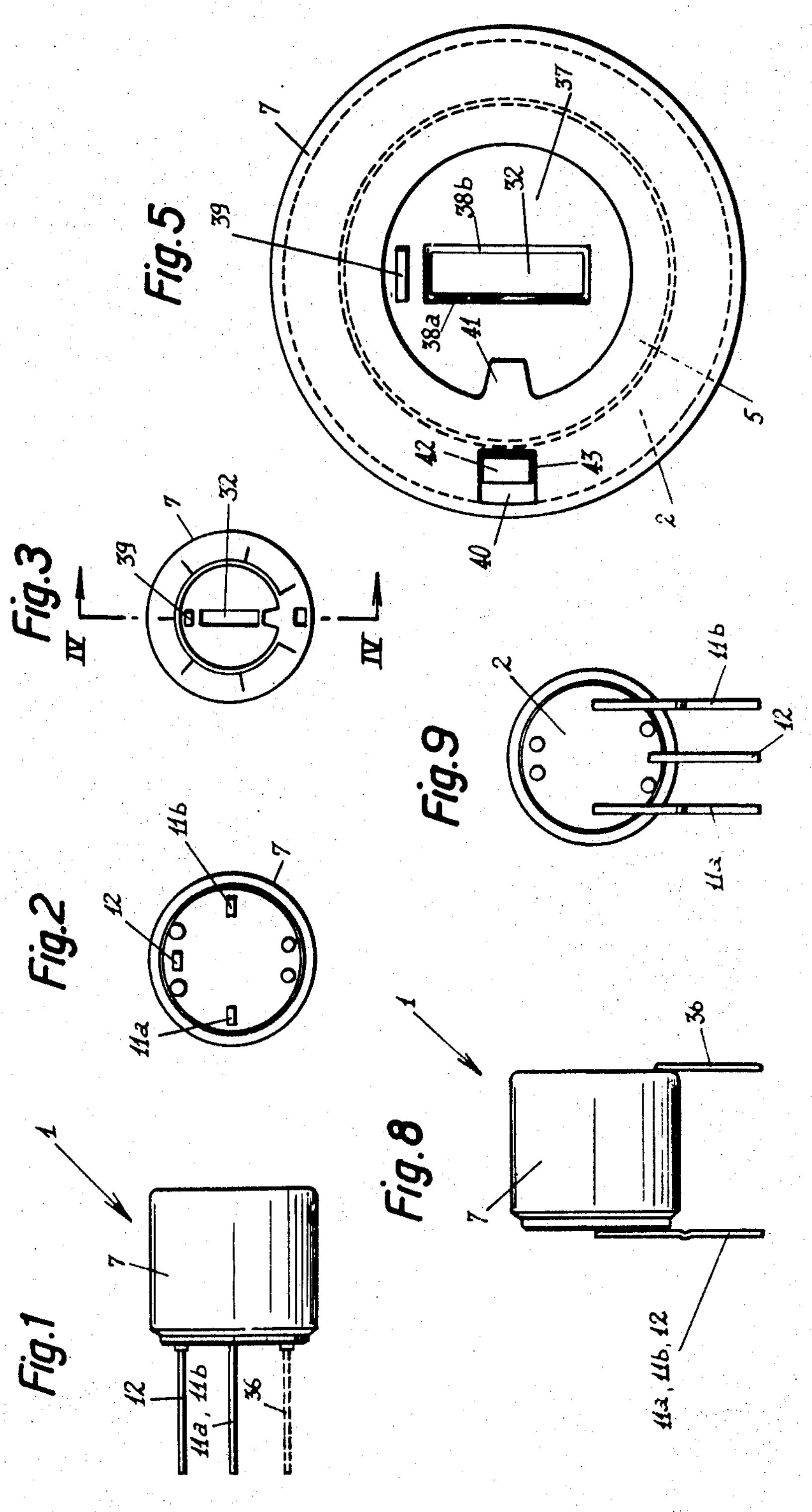
FIGS. 1, 2 and 3 are respectively a side view, a bottom view and a top view of the potentiometer, the connector-pins being parallel to its axis.
FIG. 5 is a top view corresponding to FIG. 4.
FIGS. 8 and 9 are respectively a side view and a bottom view on a small scale and corresponding to FIGS. 1 and 2, the connector-pins being elbowed at 90° in order to permit attachment of the potentiometer with its axis parallel to the plane of the printed circuit.
Figure 6:
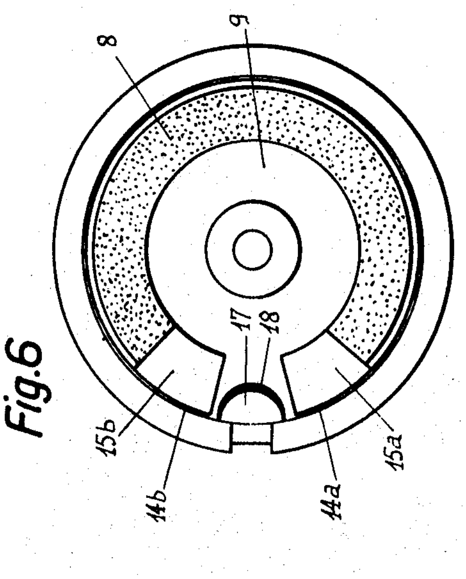
FIG. 6 is a top view on the same scale and corresponding to FIG. 4, after removal of the jacket, of the slider-actuating member and of the slider.
Figure 7:
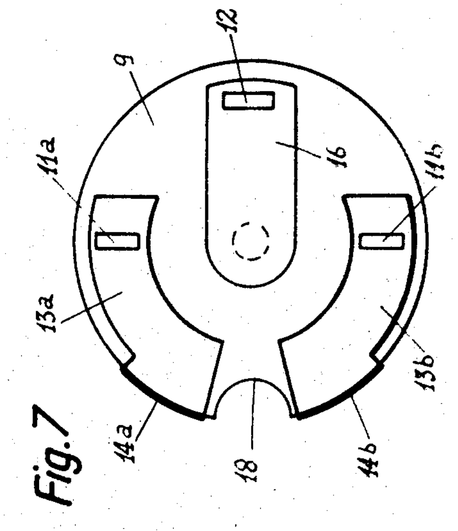
FIG. 7 is a bottom view of the support of the resistance track which is fitted with its connections.

The potentiometer can also be disposed with its axis parallel to the plane of the printed circuit by bending back to an angle of 90° the connector-pins 11*a*, 11*b*, 12 and if necessary the ground pin 36 (as shown in FIGS. 8 and 9).

In accordance with the invention, a protective metal plate 37 which is rotatably mounted within the cavity 3 of the casing 2 is placed between the actuating member 5 and the base 35 of the jacket 7. The seal 31 is covered by the periphery of the plate 37.

Provision is made in the central portion of the plate 37 for a diametrical slot having two edges 38*a*, 38*b* which are bent back and extend downwards into the slot 32 formed in the actuating member 5, thereby providing said slot 32 with a protective lining (as shown in FIGS. 4 and 5).

The plate 37 is provided at its periphery with at least one projecting stud 39 which is abuttingly applied against a boss 41 of the jacket 7 in order to limit angularly the rotation of the slider 5. A lug 42 which is formed on the casing 2 is fitted within a drilled recess 43 of the jacket 7 in order to prevent any angular displacement.

The different internal components are maintained, in the position of assembly, by virtue of the elastic pressure applied by the arms 22, 24 of the slider 4 which is provided with a counterbearing on the crimped edge 34 of the jacket 7.

The technical effect of the potentiometer as thus designed and arranged is as follows:

In order to vary the value of resistance, the user inserts a tool such as a screwdriver into the slot 32. The entire active portion of the tool bears on the bent-back edges or flanges 38*a*, 38*b* which form a lining within the slot 32.

If the tool is rotated until the end of travel is reached in one direction or in the other, the stud 39 of the plate 37 comes into abutment with the boss 41 of the jacket 7 and limits the travel.

Thus, the user cannot damage the slot 32 by means of the tool since the metal flanges 38*a*, 38*b* protect the edges of said slot. When the end of travel is reached, the user is further prevented from exerting dangerous force on a stop since the stud 39 of the plate 37 and the boss 41 of the jacket 7 are formed of metal and are therefore endowed with sufficient mechanical strength.

Finally, the potentiometer is effectively protected against impacts by the plate 37 and leak-tightness of the potentiometer as provided by the seal 31 is enhanced by the action of the plate 37.

The accidents which frequently arise when the actuating member 5 is not protected and when the stops are molded in one piece are accordingly prevented.

The potentiometer can have a diameter of less than 9 mm. and can operate between extreme temperatures of −60° and +200° C., the constituent materials being of the type mentioned earlier.

In the second embodiment which will be described with reference to FIGS. 10 and 11 and which constitutes a simplified version of the first form of construction, the potentiometer 50 comprises as in the first example a cylindrical insulating casing 2 having an axial cavity 3, a circular slider 4 and slider-actuating member 51 which are both rotatably mounted on a shaft 6, a resistance track 8 carried by a support 9, connector-pins 11*a*, 11*b*, 12 and metal jacket 7 having an opening 33.

The actuating member 51 is formed of high-strength insulating thermoplastic material having good heat resistance (e.g., the polyamides, polycarbonates, polysulfones or polyphenylenes).

The actuating member 51 is provided in its internal face with a radial groove 28 in which is engaged the driving lug 27 of the slider 4.

The actuating member is provided on its peripheral contour which is approximately cylindrical with an annular skirt 52 having annular teeth 53, the skirt 52 being molded in one piece with the actuating member 51.

The skirt 52 which is flexible and slightly resilient is applied against the internal cylindrical wall 3 of the casing 2 by means of its circular lips 53 which have a radial cross section in the shape of saw teeth. This arrangement facilitates insertion of the member 51 in the cavity 3 during assembly and then completes leak-tightness of the potentiometer on the side corresponding to the actuating member.

The lug 42 secures the jacket 7 to the casing 2 in a relative angular position.

A diametrical slot 55 is formed in the external face of the actuating member 51 in order to permit operation of this latter by means of a tool. The slot 55 which is dissymmetrical with respect to the axis of rotation 6 is closed on one side by a partition wall 56. The useful length of the slot is *h*.

The jacket 7 is provided with at least one boss 57 which projects within the window 33 of the base 35 of the jacket 7.

Index marks 58 are provided on the base 35 of the jacket 7 in order to adjust the position of the slider 4.

The technical effect is as follows:

In order to actuate the slider 4, use is made of a screwdriver having an active tip which is slightly smaller in width than the useful length *h* of the slot 55.

Rotation is possible as long as the edge of the screwdriver which is placed opposite to the partition wall 56 is located at a distance from the boss 57. When this edge of the screwdriver comes into contact with the boss 57, rotation is no longer possible.

The user cannot cause damage by exerting excessive force on the boss 57 since this latter is metallic. It is also impossible to impair the slot 55 inasmuch as this latter is not subjected to any forces other than the minimum couple which is necessary in order to displace the slider 4 and the actuating member 51.

The edges of the slot 55 are not provided with a protective lining as is contemplated in the first example but only the above-mentioned couple is transmitted by the slot and is not liable to cause any damage to this latter.

Leak-tightness is ensured by means of the annular teeth 53 of the skirt 52. The dissymmetrical structure of said teeth ensures that these latter are more tightly applied against the walls 3 of the casing 2 in the event of external overpressure.

Furthermore, this simplified construction of the potentiometer is lower in capital cost.

Adjustment of the slider is facilitated by the index marks 58.

Finally, should it be found desirable to subject the slider 4 to a complete rotation, it is only necessary to employ a smaller screwdriver which will not be stopped by the boss 57.

As is readily understood, the invention is not limited to the two examples hereinabove described and alternative forms of execution can accordingly be contemplated.

Among the different alternatives which are open to selection, the circular slider may be different from the type mentioned in the foregoing examples.

What we claim is:

1. A rotary-contact potentiometer, especially of the miniature type and primarily intended for use in electronic circuitry, comprising an insulating casing having an axial cavity, a slider slidably movable on a resistance track and a slider-actuating member which are both rotatably mounted on the casing, the slider-actuating member having a diametrical slot to receive an operating tool, an external metal jacket which surrounds the casing and maintains all the components in position, at least one stop limiting the angular displacement of the slider-actuating member and comprising a boss on the jacket, and means for protecting the slot in the slider-actuating member against the stresses exerted on it by an operating tool when the rotation of the slider-actuating member is stopped by the stop.

2. A potentiometer according to claim 1, wherein the diametrical slot of the slider-actuating member is protected by a protective lining.

3. A potentiometer according to claim 2, wherein the protective lining is constituted by two flanges forming part of the protective plate and engaged in the diametrical slot.

4. A potentiometer according to claim 1, wherein the extension of said diametrical slot on one side of a plane passing through the axis of rotation of said potentiometer is greater than the extension of said slot on the other side of said plane.

5. A potentiometer according to claim 4, wherein said protective jacket has a window formed for the insertion of the operating tool into said slot of the slider-actuating member, and wherein said boss of the protective jacket is formed on the edge of said window.

6. A potentiometer according to claim 1, wherein the slider and slider-actuating member are separated from the exterior by means of a protective rotary plate to which a driving movement from the exterior is intended to be applied.

7. A potentiometer according to claim 6, wherein the protective plate is rotatably mounted within the cavity of the casing between the jacket which surrounds said casing and a flexible annular seal which surrounds the slider-actuating member.

8. A potentiometer according to claim 6, wherein the protective plate comprises at least one projecting stud which comes into abutment with a boss of the jacket in order to limit angularly the rotation of the slider.

9. A potentiometer according to claim 1, wherein the slider-actuating member is provided with a slightly flexible and resilient annular skirt, the edge of said skirt being applied elastically against the internal wall of the cavity of the casing.

* * * * *